(12) United States Patent
Yuan

(10) Patent No.: US 8,739,586 B2
(45) Date of Patent: Jun. 3, 2014

(54) ELECTRICAL LINER ACTUATOR FOR LOCK

(75) Inventor: Mengxiao Yuan, Guangdong (CN)

(73) Assignee: Locway Technology Co., Ltd., Dongguan Guangdong (CN)

( * ) Notice: Subject to any disclaimer, the term of this patent is extended or adjusted under 35 U.S.C. 154(b) by 0 days.

(21) Appl. No.: 13/551,678

(22) Filed: Jul. 18, 2012

(65) Prior Publication Data

US 2013/0043751 A1    Feb. 21, 2013

(51) Int. Cl.
*E05B 47/00* (2006.01)

(52) U.S. Cl.
USPC ......... 70/278.7; 70/280; 70/432; 70/DIG. 54; 292/144; 292/DIG. 61

(58) Field of Classification Search
USPC ............. 70/432, 277, 278.7, 279.1, 280–283, 70/DIG. 54, DIG. 55; 292/144, DIG. 61; 74/424.77; 267/166, 170, 174, 179
See application file for complete search history.

(56) References Cited

U.S. PATENT DOCUMENTS

| | | | | |
|---|---|---|---|---|
| 1,862,992 A * | 6/1932 | Vargha | ........................ | 267/166 |
| 3,190,631 A * | 6/1965 | Kaiser | ........................ | 267/179 |
| 3,767,180 A * | 10/1973 | Kaiser | ........................ | 267/91 |
| 4,077,619 A * | 3/1978 | Borlinghaus | .............. | 267/166.1 |
| 5,018,375 A * | 5/1991 | Tully | ........................... | 70/472 |
| 5,083,122 A * | 1/1992 | Clark | ........................... | 340/5.22 |
| 5,203,546 A * | 4/1993 | Amadore | ..................... | 267/168 |
| 5,249,831 A * | 10/1993 | Maniaci | ........................ | 292/144 |
| 5,615,870 A * | 4/1997 | Balsells | ........................ | 267/167 |
| 5,628,216 A * | 5/1997 | Qureshi et al. | ............... | 70/278.7 |
| 5,709,371 A * | 1/1998 | Balsells | ........................ | 267/167 |
| 6,533,259 B2 * | 3/2003 | Devambe | ..................... | 267/166 |
| 7,055,812 B2 * | 6/2006 | Balsells | ........................ | 267/167 |
| 7,275,282 B2 * | 10/2007 | Brose | ............................. | 16/201 |
| 7,929,859 B2 * | 4/2011 | Saiki | ............................ | 396/543 |
| 8,302,438 B2 * | 11/2012 | Lui | ................................ | 70/277 |
| 8,337,368 B2 * | 12/2012 | Weller | ........................... | 482/35 |
| 8,356,499 B2 * | 1/2013 | Peng | ............................. | 70/283 |
| 2004/0070128 A1 * | 4/2004 | Balsells | ........................ | 267/180 |
| 2006/0150694 A1 * | 7/2006 | Frolov et al. | ................... | 70/277 |
| 2008/0303290 A1 * | 12/2008 | Yuan | ........................... | 292/195 |
| 2010/0122561 A1 * | 5/2010 | Lui | ................................ | 70/277 |
| 2012/0006082 A1 * | 1/2012 | Peng | ............................ | 70/277 |

FOREIGN PATENT DOCUMENTS

CN    ZL01243139    5/2002

* cited by examiner

*Primary Examiner* — Lloyd Gall
(74) *Attorney, Agent, or Firm* — Jackson IPG PLLC

(57) ABSTRACT

The invention relates to an electrical linear actuator for a lock, which comprises a motor, a rotating shaft connected with the motor, a spring sleeved on the rotating shaft and a pin arranged on the rotating shaft and also comprises a slider, wherein the slider is provided with a frame capable of receiving the shaft and the spring; grooves for limiting the rotating shaft are formed on a wall; the spring comprises a first winding, end coils and second windings; the first winding is arranged in the middle part of the spring and takes the shape of a cylindrical spiral; the end coils are respectively arranged at both ends of the spring and coaxial with the first winding; the second windings are arranged between the first winding and the end coils, and circumscribed circles of the second windings are convex relative to the first winding; and third windings coaxial with the first winding can be arranged between the second windings and the end coils.

19 Claims, 4 Drawing Sheets

ELECTRICAL LINER ACTUATOR FOR LOCK

FIELD OF THE INVENTION

The invention relates to a lock, in particular to an electrical liner actuator for a combination lock.

BACKGROUND OF THE INVENTION

The traditional electrically operated lock, in particular a combination lock, commonly uses a lock clutch mechanism driven by a micromotor in order to save the space and reduce the energy consumption. One technical proposal is to adopt a spiral spring sleeved on a rotating shaft and a pin fixed on the rotating shaft, convert the rotary motion of the rotating shaft of the motor into the rectilinear motion between the spring and the pin, and then drive or pull the clutch mechanism or a latching mechanism of the lock to operate, and finally realize the control of the lock.

The U.S. Pat. No. 5,018,375 (Issue Date: Mar. 28, 1991) discloses a lockset having electric means for disabling and enabling the outer handle. The electric means is characterized in that: a transverse pin is arranged on a motor shaft; a spiral spring is sleeved on the shaft; one end of the spring is fixed on a clutch disc; the last two turns at the other end of the spring are tightly winded on the shaft; and the pin is just disposed between adjacent turns of the spring. When the motor shaft rotates, the pin is driven to move to the right of the spring along a spiral of the spring; the function of the spring on the pin in the process is a nut; and the clutch disc is pulled by the spring for engagement. When the motor shaft rotates counterclockwise, the pin is driven to move to the left of the spring along the spiral of the spring and the clutch disc can be driven for disengagement.

The Chinese patent No. ZL01243139 (Issue Date: May 15, 2002) discloses a sliding plate push-and-pull displacement electric mechanism for a lock, which is characterized in that: a slider capable of performing axial movement and a spring capable of driving the slider to move are sleeved on a rotating shaft; both ends of the spring are extended into an axial groove of the slider along the radial direction; a cotter pin is fixed in the middle part of the rotating shaft; and both ends of the cotter pin are extended along the radial direction and can be screwed into two adjacent turns of the spring, so that the spring is driven to rotate clockwise and counterclockwise along the cotter pin and move back and forth on the shaft.

As the same with numerous technical proposals of combination locks, the motor adopted by the above technical proposal is a common DC micromotor. Due to the parameter decentrality during the motor manufacturing and the voltage variation of supplying cells, the rotating speed error of the motor may be large, and the travel of the pin on the rotating shaft is difficult to control even by adopting a reducing gear train and controlling the conduction time. Therefore, in most cases, the pin moves to the end part (the final turn) of the spring and may perform circulating rotation at the position as no spiral is provided for the pin to move along.

When the pin performs relative motion along the spiral of the spring, the spring is compressed due to the pressure of the pin and large friction is generated, and finally a force which drives the spring to rotate along with the shaft is generated due to the friction. Particularly, in the case of abnormal unlocking or locking, for example, a lock handle is pulled at the moment or the lock handle is pulled first and then an unlocking command is input when the motion of the clutch mechanism is not in place, common manual operation errors like this will result in the clamping of the slider driven by the spring and then possible complete compression of the spring. Herein, the friction force is maximized and the extrusion of adjacent turns of the spring is generated, thus not only the spring tends to rotate along the shaft but also the pin cannot enter into a spiral track of the spring when the motor is started counterclockwise, consequently unlocking or locking failures are produced. Moreover, after the pin is disposed at a limiting position of one end, the next motion is the reversing rotation of the pin. As no buffer mechanism is arranged, the spring will jitter or bounce due to the impact of the pin on the spring when the motor is started counterclockwise, thus the failure that the pin cannot smoothly enter into the spiral track of the spring after the rotating shaft changes the rotation direction may be caused, consequently the clutch mechanism for the lock fails.

SUMMARY OF THE INVENTION

The invention aims to provide an electrical liner actuator for a lock, with high reliability and simple structure.

The invention adopts the technical proposal that:

The invention relates to an electrical liner actuator for a lock, which comprises a motor, a rotating shaft connected with the motor, a spring sleeved on the rotating shaft and a pin arranged in the middle part of the rotating shaft and also comprises a slider, wherein the slider is provided with a frame capable of receiving the rotating shaft and the spring; grooves for limiting the rotating shaft are formed on a wall of the frame; and the spring comprises a first winding, end coils and second windings, in which the first winding is arranged in the middle part of the spring and takes the shape of a cylindrical spiral; the end coils are arranged at both ends of the spring and coaxial with the first winding; the second windings are arranged between the first winding and the end coils, and circumscribed circles of the second windings are convex relative to the first winding; and both ends of the second windings are respectively connected with the first winding and the end coils, which are adjacent to the second windings.

Furthermore, third windings coaxial with the first winding are also arranged between the second windings and the end coils; and both ends of the third windings are respectively connected with the end coils and the second windings, which are adjacent to the third windings.

Preferably, the diameter of the first winding is less than that of the end coils; and corresponding end coils and third windings form conical springs.

Preferably, the second windings of the spring take the shape of circular rings of which the diameter is less than that of the first winding; and the spiral direction thereof is opposite to that of the first winding.

Preferably, the axial projection angle difference θ between centerlines of the second windings of the spring is between 70 degree and 90 degree.

Preferably, the second windings of the spring are arranged in the form of central symmetry; and the axial projection angle difference θ between the centerlines of the second windings of the spring is 180 degree.

Preferably, the second windings of the spring are V-shaped; one side of each V-shaped second winding is tangential to the first winding while the other side of the V-shaped second winding is tangential to one of the third windings; and two sides tangential to the third windings are parallel to each other.

Preferably, the second windings (43, 44) of the spring (4) are V-shaped; and the diameter of circular arcs at the bottoms of the V-shaped second windings is less than that of the first winding (40).

Furthermore, the axial projection angle difference θ of the second windings of the spring is between 70 degree and 90 degree.

According to the technical proposal of the invention, notches are formed at corresponding positions of the frame of the slider and the second windings; portions of the tops V-shaped portions of the second windings are extended into the notches.

According to the technical proposal of the invention, the vertical distance from convex vertexes of the second windings to an axial line of the first winding is more than the vertical distance from inner walls of the slider to the axial line of the first winding after the spring is assembled into the slider.

Preferably, transition portions are formed between the second windings and the first winding; the helix angle of the transition portions is the sum of the helix angle α of the first winding and the inclination angle β; and the inclination angle β is between 3 degree and 7 degree.

Preferably, the pin is fixed in a hole formed on the rotating shaft; one portion of the pin extended out of the rotating shaft has a smooth outer surface; and the extended portion is arranged above the first winding.

Preferably, the pin is formed by bending a steel wire; bends are formed at both ends of the pin; and both ends of the steel wire are disposed in the middle part of the pin.

Furthermore, one steel wire end of the pin is bent into a gap which forms an acute angle with an axial line of the pin.

Preferably, the pin is formed by bending a steel wire; one end of the pin is a ring and the other end of the pin is a bend; and both ends of the steel wire are disposed in the middle part of the pin.

Furthermore, one steel wire end of the pin is bent into a gap opening which forms an acute angle with an axial line of the pin.

In another preferred embodiment, the grooves formed on a wall of the slider (2) are U-shaped grooves.

In another preferred embodiment, a convex wing is formed on the outer surface of the slider and used for being engaged with a position detection switch arranged inside a lock body to detect the position of the slider.

By adoption of the technical proposal, the invention has the advantages that:

Due to the convex shape of the second windings of the spring of the invention, not only the travel of the relative motion of the spring and the pin can be limited by the change of the spiral of the spring but also the pin can smoothly enter into the spiral track of the first winding in the case of reversing rotation through the continuous smooth transition portion between the second winding and the first winding at the end which is not compressed and an inclined gap between the transition portion and a first coil of the first winding in the case of complete compression of the first winding of the spring. Meanwhile, the radial rotation of the slider relative to the spring is limited in virtue of the contact of the second windings and the inner walls of the slider, so that the case that the spring rotates along with the shaft is prevented, thus the reliability of the mechanism is improved.

The third windings of the invention can absorb and buffer the vibration and impact caused by the pin on the spring when the motor is started and reversed during the abnormal operation of the lock. Moreover, the distortion or bouncing of the spring can also be prevented, so that the pin is assured to smoothly enter into the spiral track of the spring, thus the relative motion between the pin and the spring is more stable and reliable.

As the pin is formed by bending the steel wire and the extended portion thereof is smooth and has no sharp sides and burrs, not only the spring is prevented from being scored but also the forming or grinding of the extended portion of the pin is saved.

DETAILED DESCRIPTION OF THE PREFERRED EMBODIMENTS

Figure 1:
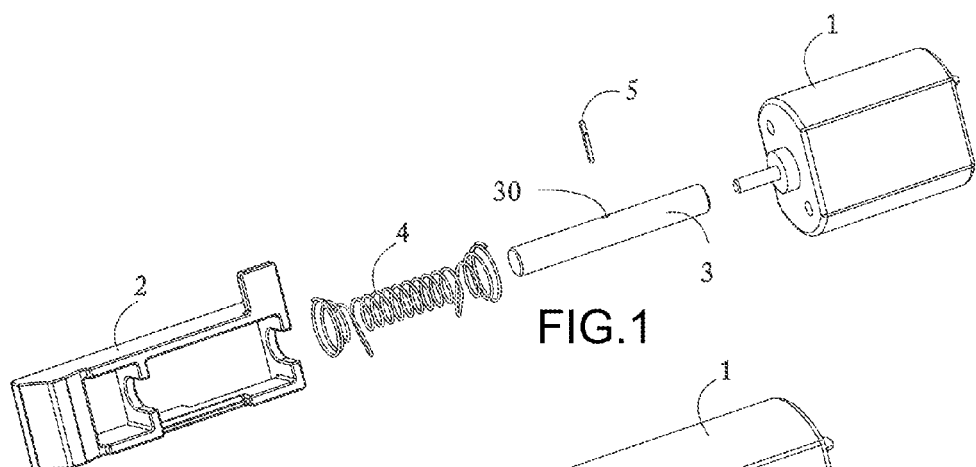
FIG. 1 is a schematic exploded view of the invention.
Figure 2:
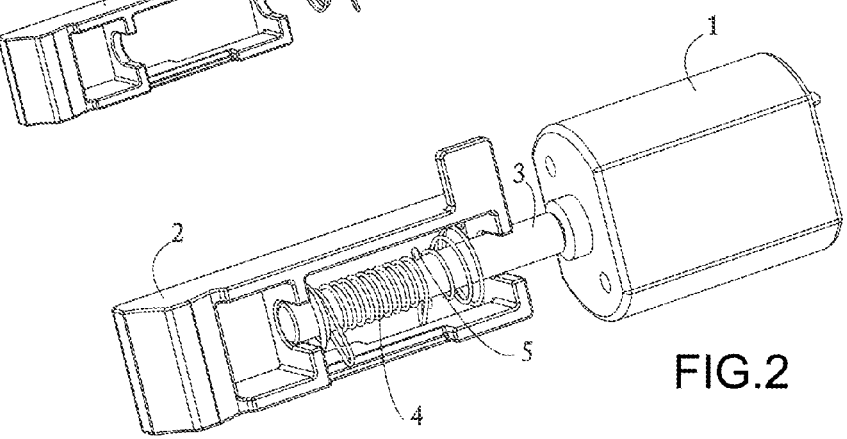
FIG. 2 is a schematic perspective view of the spring/motor/pin/slider assembly of the FIG. 1.
Figure 3:
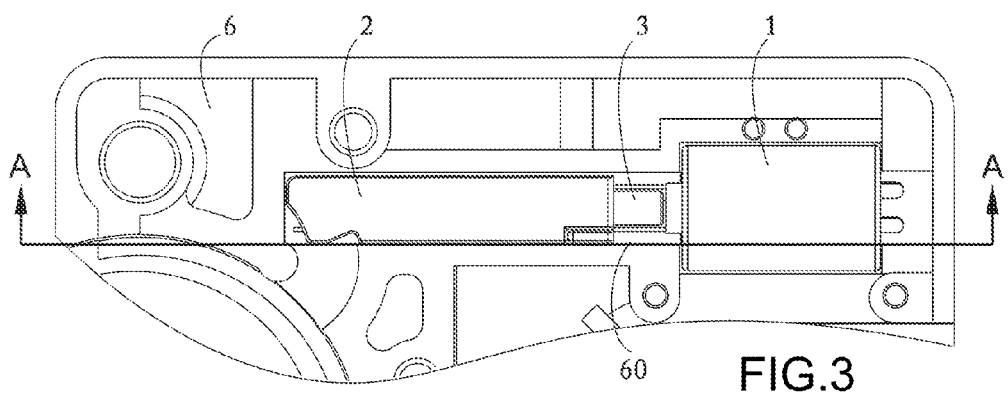
FIG. 3 is a schematic sectional view of the electrical liner actuator is assembled into a lock's housing.
Figure 4:
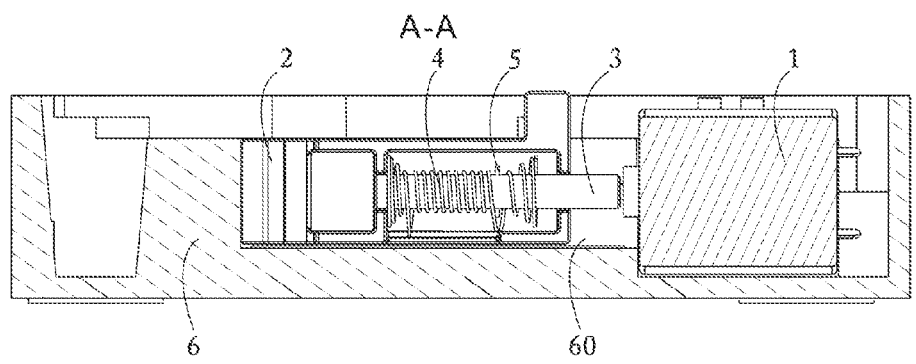
FIG. 4 is an A-A section view of FIG. 3.

For those skilled in the art to further understand the invention, detailed description is given below with the attached drawings and embodiments.

As illustrated in FIGS. 1 to 4, the electrical liner actuator provided by the invention consists of a motor 1, a slider 2, a rotating shaft 3, a spring 4 and a pin 5, wherein the motor 1 is a common DC micromotor and directly connected with the rotating shaft 3; a hole 30 for fixing the pin 5 is formed on the rotating shaft 3; the spring 4 is sleeved on the rotating shaft; an extended portion of the pin 5 is disposed between two adjacent winding coils of the spring 4; the motor is fixed inside a lock's housing 6; the slider 2 is arranged inside a sliding chute 60 which is arranged inside the lock's housing 6; and the sliding chute has the function of limiting and guiding the slider 2. In the embodiment of the invention, a solid portion 28 is formed at one end of the slider 2 and has the function of blocking the retraction of a lock bolt. Obviously, the slider 2 can also be connected or engaged with other components of the lock to form a locking/unlocking control mechanism for the lock or a clutch means for the lock.

Figure 5:
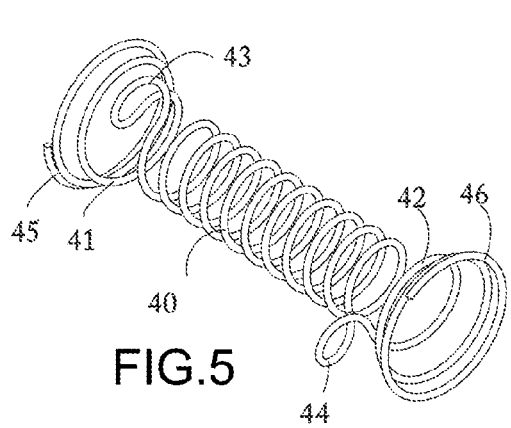
FIG. 5 is a schematic view of a first structure of the spring of the invention.
Figure 6:
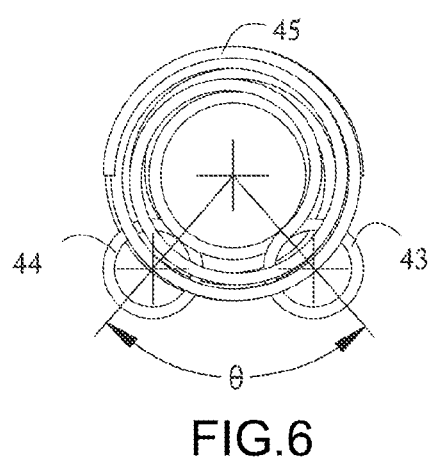
FIG. 6 is an axial view of FIG. 5.

FIGS. 5 and 6 illustrate a first structure of the spring 4. As illustrated in the figures, the two convex second windings 43 and 44 are formed by respectively and reversely winding a circular ring with small diameter on an abaxial surface of the first winding, at both ends of the first winding 40 of the spring, and continuous smooth transition portions are respectively formed between the circular rings and the first winding. It can be seen from FIG. 6 that the two second windings are symmetrically distributed and the included angle θ between centerlines of the two second windings is between 70 degree and 90 degree and is 80 degree in the embodiment. After the spring is assembled into the slider, the distance from vertexes of circumscribed circles of the second windings to the center of the rotating shaft, namely the radius of gyration, is more than the vertical distance from inner wall surfaces 21 and 22 of a slider frame to an axial line of the rotating shaft, and herein the vertexes of the circumscribed circles of the second windings of the spring make contact with wall surfaces of the slider frame. Obviously, no matter the spring rotates towards any direction, an circumscribed circle of one second winding would make contact with the inner wall surface 21 or 22 of the slider frame to prevent the spring from rotating.

Figure 7:
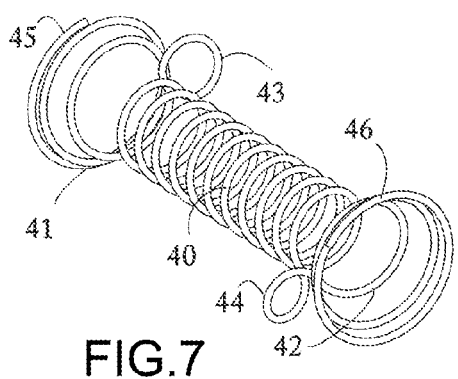
FIG. 7 is a schematic view of a second structure of the spring of the invention.
Figure 8:
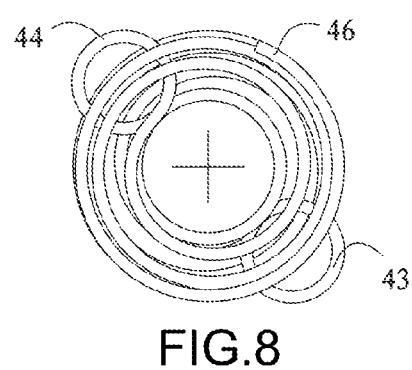
FIG. 8 is an axial view of FIG. 7.

FIGS. 7 and 8 illustrate a second structure of the spring 4, which is basically the same with the first structure of the spring 4. The difference is that the axial projection position of the two second windings 43 and 44 is changed. It can be seen from FIG. 8 that the two second windings are subjected to 180 degree symmetrical distribution and the distance from the vertexes of the circumscribed circles of the second windings to an axis, namely the radius of gyration, is more than the vertical distance from the inner wall surfaces 21 and 22 of the slider frame to the axis. During the actual application, top portions of the second windings, close to inner walls of the slider frame, and the inner walls of the slider frame are subjected to appropriate elastic contact, so that the spring is prevented from rotating.

Figure 9:
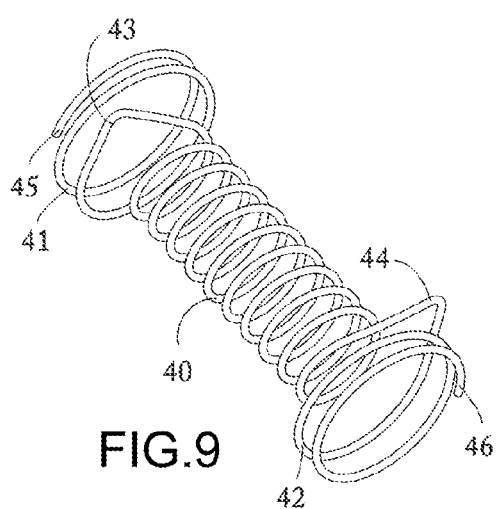
FIG. 9 is a schematic view of a third structure of the spring of the invention.
Figure 10:
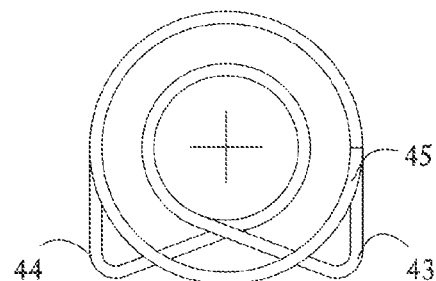
FIG. 10 is an axial view of FIG. 9.

FIGS. 9 and 10 illustrate a third structure of the spring 4. As illustrated in the figures, the second windings 43 and 44 are V-shaped; two sides of the V-shaped second windings 43, 44 are respectively tangential to first coils of the first winding 40 and the third windings 41 and 42, connected with the second windings; two sides 43,44 tangential to the first coils of the third windings are parallel to each other; and the distance from V vertexes of the second windings to the axis, namely the radius of gyration, is more than the vertical distance from the inner wall surfaces 21 and 22 of the slider frame to the axis. The spring with the structure has two means for being assembled into the slider. The first means is that the two parallel sides are respectively inserted into the slider frame, in parallel to each other, and the spring can be prevented from rotating radially by the contact of the parallel sides and the inner walls of the slider frame. The second means is that the spring structure is inserted into the slider frame such that the parallel sides of the V-shaped second windings are perpendicular to the inner walls of the slider frame, and thus the spring can be prevented from rotating by the contact of the parallel sides and an inner wall of the sliding chute 60 of the lock's housing 6.

Figures 11, 12:
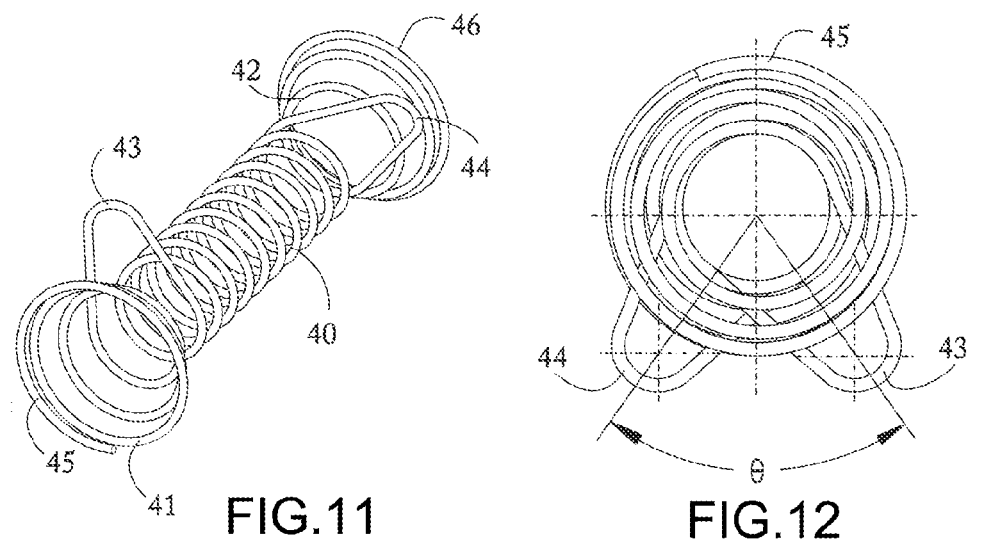
FIG. 11 is a schematic view of a fourth structure of the spring of the invention.
FIG. 12 is an axial view of FIG. 11.

FIGS. 11 and 12 illustrate a fourth structure of the spring 4. As illustrated in the figures, the second windings 43 and 44 are V-shaped; circular arcs of which the diameter is less than that of the first winding 40 are formed at the bottoms of the V-shaped second windings; one side of each V-shaped second winding is tangential to the first winding and the other side is tangential to the third windings 41 and 42; and the included angle θ between centerlines of the two V-shaped second windings is between 70 degree and 90 degree and is 80 degree in the embodiment. The difference between the structure and the above structures of the spring is that two symmetrical notches 25 and 26 can be respectively formed at positions of the slider 2, corresponding to the second windings 43 and 44, so that portions of the V-shaped second windings are extended into the notches of the slider, thus better effect of preventing the spring from rotating radially can be achieved. Obviously, in the case of no notch formed on the slider, appropriate shortening of V-shaped portions can also achieve the same effect with the first structure of the spring.

It can also be seen from several structures of the spring 4 as illustrated in FIGS. 5 to 12 that the third windings 41 and 42 adjacent to the second windings 43 and 44 and the first winding 40 of the spring are coaxially winded clockwise, and the coil number of the third windings can be one or more according to actual application conditions. According to a preferred proposal, the third windings 41 and 42 and the end coils 45 and 46 form conical springs, and the diameter of circumscribed circles of the end coils (or large coils of the conical springs) is close to but not more than the inner width of the slider frame, so that the spring 4 can be limited within the frame and particularly can be prevented from torsioning or bouncing in the case of abnormal operation.

Figure 13:
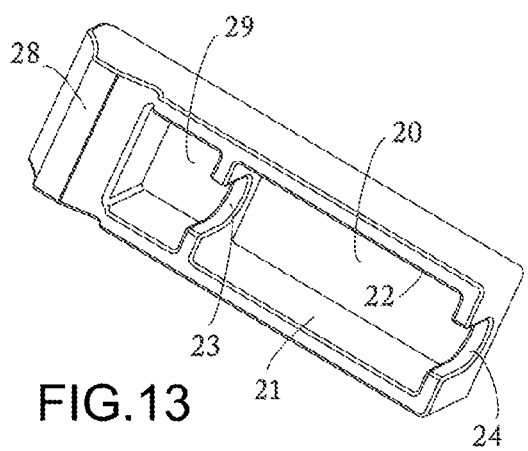
FIG. 13 is a schematic view of the slider of the invention.

FIG. 13 illustrates one structure of the slider 2, wherein a frame 20 is used for receiving and limiting the spring 4 and another frame 29 is used for leaving space for the displacement of the rotating shaft 3 relative to the slider; and U-shaped grooves 23 and 24 formed on a wall are taken as guide holes of the rotating shaft 3 and have the function of limiting the radial displacement of the shaft. Of course, the guide holes can also take the shape of circular orifices but are more economical to adopt U-shaped grooves in view of convenient assembly and simplified production.

Figure 14:
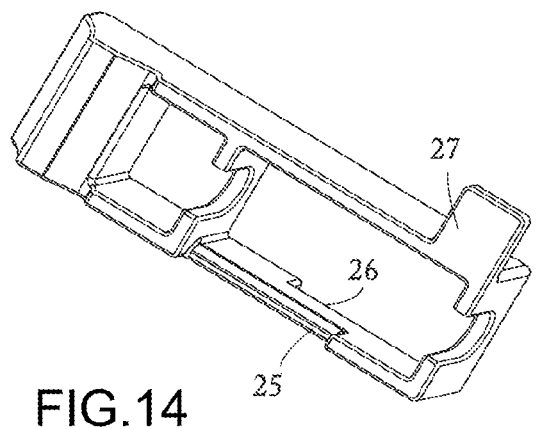
FIG. 14 is another schematic view of the slider of the invention.

FIG. 14 illustrates another structure of the slider 2. The two differences from the structure of the slider as illustrated in FIG. 13 are as follows: one is that the notches 25 and 26 are formed at positions of one wall 21 of the slider, corresponding to the second windings 43 and 44 of the spring, and portions of the tops of the second windings are respectively extended into the notches and have the function of preventing the spring from rotating radially. Of course, the notches can also be formed at corresponding positions of another wall 22, which has the same effect. The other is that a convex wing 27 is formed on the slider and has the function of being engaged with an (electromechanical or photosensitive) position switch arranged at a corresponding position in the lock's housing and determining the state information of the lock bolt by detecting the position of the slider 2.

Figure 15:
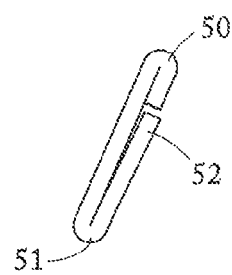
FIG. 15 is a schematic view of the pin of the invention.

FIG. 15 illustrates one structure of the pin 5, wherein the pin 5 is formed by bending a steel wire; two bends 50 and 51 are formed at both ends of the pin; two steel wire ends are disposed in the middle part of the pin; a hole 30 subjected to interference fit with the pin 5 is formed on the rotating shaft; and the bends 50 and 51 of the pin after assembly are taken as extended portions of the pin, which make contact with the spring 4. Compared with a pin formed by direct cutting and turning, the extended portions of the pin 5 provided by the invention are smooth and have no sharp sides and corners or buns, thus the hooking, scraping and scoring of the spring can be avoided and the manufacturing procedure of forming or grinding can also be saved.

Figure 16:
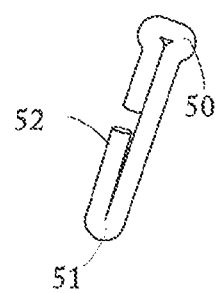
FIG. 16 is another schematic view of the pin of the invention.

FIG. 16 illustrates another structure of the pin 5, wherein the other portions are the same with those of the pin as illustrated in FIG. 15 except that the bend 50 at one end takes the shape of a double bent structure. The arrangement of the circular ring is for the convenience of oriented assembly.

In the two structures of the pin 5, one steel wire end of the pin 5 can be bent into a gap 52 which forms an acute angle with an axial line of the pin, so that a stretching force is generated to prevent the pin from dropping off the shaft hole after the pin is assembled into the shaft hole 30. Meanwhile, the machining precision of the shaft hole can also be reduced.

Figure 17:
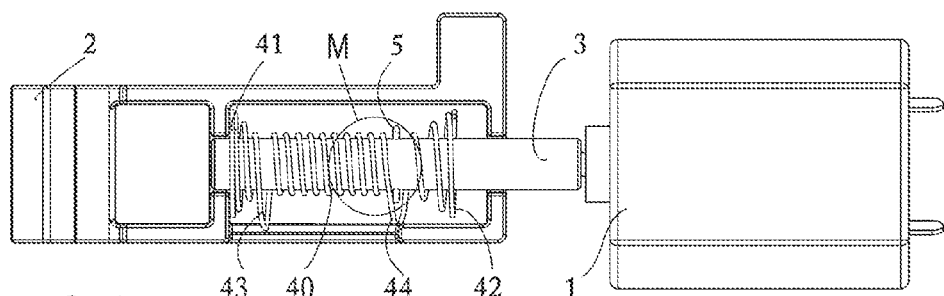
FIG. 17 is a schematic view of the invention illustrating the state when the slider is disposed at an extended position.

The working process of the invention is described below with the attached FIGS. 17 and 18:

As illustrated in FIG. 17, the slider 2 is disposed at an extended position and the pin 5 is disposed at a transition portion between the right of the first winding 40 and the second winding 44. For the slider 2 to move to a retracted position as illustrated in FIG. 18, the motor 1 and the rotating shaft 3 rotate clockwise; the pin 5 enters into the first winding 40 of the spring from the transition portion and continues to rotate along the spiral of the spring, so that coils of the first winding 40 on the left of the pin are driven to move to the right of the pin in turn; meanwhile, the spring is compressed and drives the slider 2 to move to the right until the pin 5 is disposed at a transition portion between the left of the first winding and the second winding 43; the rectilinear displacement between the spring and the pin is terminated due to the change of the spiral direction; the pin 5 at the transition portion can only perform circulating rotation but the rectilinear displacement of the spring cannot be generated; and in the process, the slider 2 is driven by the spring 40 to move to the retracted position.

Figure 18:
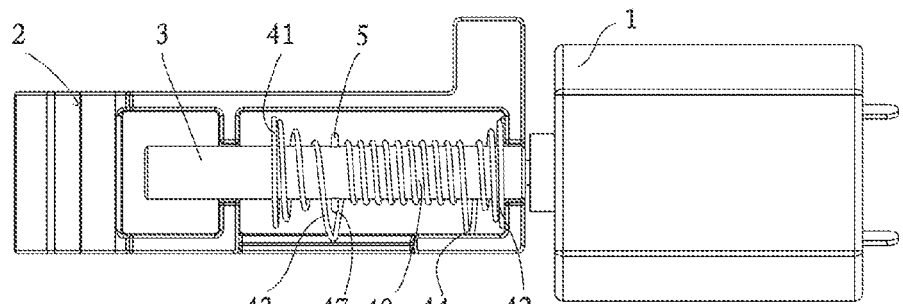
FIG. 18 is a schematic view of the invention illustrating the state when the slider is disposed at a retracted position.

On the contrary, for the slider 2 to move from the retracted position as illustrated in FIG. 18 to the extended position as illustrated in FIG. 17, the motor 1 and the rotating shaft 3 rotate counterclockwise; the pin 5 enters into the first winding from the transition portion between the left of the first winding 40 and the second winding 43 and continues to rotate along the spiral of the spring, so that coils of the first winding 40 on the right of the pin 5 are driven to move to the left of the pin in turn; meanwhile, the spring 40 is compressed and drives the slider 2 to move to the left until the pin 5 is disposed at the transition portion between the right of the first winding and the second winding 44 of the spring; the rectilinear displacement between the spring and the pin is terminated due to the change of the spiral direction; the pin 5 at the transition portion can only perform circulating rotation but the rectilinear displacement of the spring cannot be generated; and in the process, the slider 2 is driven by the spring 40 to move to the extended position as illustrated in FIG. 17.

Figure 19:
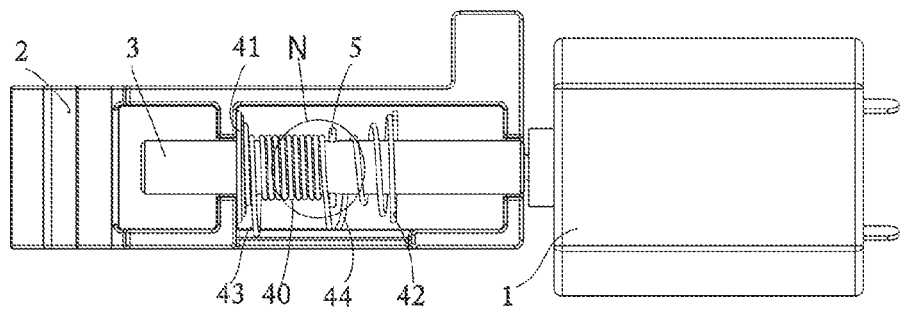
FIG. 19 is a schematic view of the invention illustrating the state when the slider is disposed at the retracted position and the spring is in the completely compressed state.

FIG. 19 illustrates the state when the slider is disposed at the retracted position and the spring is completely compressed in the case of abnormal operation. It can be seen from the figure that the slider 2 is clamped by an external force due to the abnormal operation and cannot move to the extended position although the spring 4 is kept in the state of being compressed to drive the slider 2 (the slider 2 will move to the extended position as illustrated in FIG. 18 in the case of normal operation). Herein, the first winding is completely compressed to the left of the slider frame (the second winding 43 and the third winding 41 on the left of the spring 4 are also compressed) and the second winding 44 and the third winding 42 close to the pin side are not compressed and in the free state. Similarly, if the slider 2 is clamped at the extended position, the first winding is completely compressed to the right of the slider frame (the second winding 44 and the third winding 42 on the right of the spring 4 are also compressed), and herein the second winding 43 and the third winding 41 close to the pin side are not compressed and in the free state.

Figure 20:
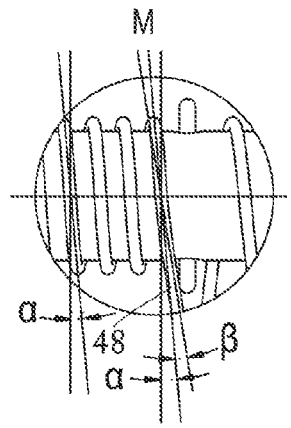
FIG. 20 is a partial enlarged view of FIG. 17.

As illustrated in FIG. 20, the inclination angle $\beta$ is formed between the helix angle $\alpha$ of the transition portion 48 between the second winding 44 and the first winding 40 and the helix angle $\alpha$ of the first winding 40, namely the helix angle of the transition portion 48 is the sum of the helix angle $\alpha$ of the first winding 40 and the inclination angle $\beta$. Similarly, the incli-nation angle $\beta$ is also formed between the helix angle $\alpha$ of the transition portion 48 between the second winding 43 and the first winding 40 and the helix angle $\alpha$ of the first winding 40, namely the helix angle of the transition portion 48 is the sum of the helix angle $\alpha$ of the first winding 40 and the inclination angle $\beta$.

Figure 21:
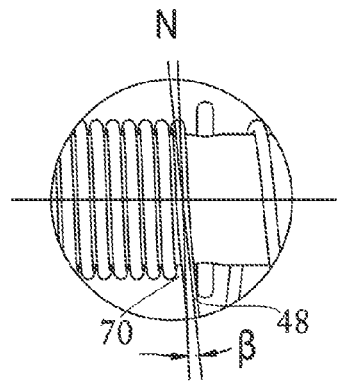
FIG. 21 is a partial enlarged view of FIG. 19.

As illustrated in FIG. 21, when the first winding 40 is completely compressed to the right of the slider frame, the inclination angle $\beta$ is still not changed, so that an inclined gap 70 is formed between a first coil of the first winding 40 and the transition portion 48. When the spring 4 is required to be restored to the normal state as illustrated in FIG. 17, the motor 1 is driven to rotate counterclockwise and the pin 5 can smoothly enter into the spiral track of the first winding which is still in the compressed state through the inclined gap 70, so that the electrical liner actuator can be restored to the normal state. Obviously, the case when the first winding is completely compressed to the right of the slider frame is completely the same with the above case.

It should be noted that several structures of the spring enumerated in the embodiments of the invention have the inclination angle $\beta$ and the inclined gap and the inclination angle $\beta$ can be set according to actual demands in the case of the winding of the spring 4 and is between 3 degree and 7 degree and is 5 degree in the invention.

It can also be seen from FIGS. 17, 18 and 19 that the rotation direction of the motor started each time is opposite with that of the last time and the direction of the relative rectilinear displacement driven is consistent with that of a release force of the compressed first winding of the spring. The release force of the compressed first winding 40 of the spring is maximized particularly in the case of abnormal operation. The third windings 41 and 42 can buffer the impact caused by the starting of the motor and the release of the elastic force of the first winding, so that the electrical liner actuator provided by the invention can be more stable and reliable in operation.

What is claimed is:

1. An electrical linear actuator for a lock, comprising:
   a motor (1),
   a rotating shaft (3) connected with the motor,
   a spring (4) sleeved on the rotating shaft and
   a pin (5) arranged in the middle part of the rotating shaft;
   also comprising:
   a slider (2), wherein the slider provided with a frame (20) capable of receiving the rotating shaft and the spring;
   grooves (23, 24) for limiting the radial displacement of the rotating shaft (3) formed on a wall of the frame (20); and
   the spring (4) comprising:
   a first winding (40),
   end coils (45, 46) and
   second windings (43, 44),
   in which the first winding (40) arranged in the middle part of the spring and takes the shape of a cylindrical spiral;
   the end coils (45, 46) arranged at both ends of the spring and coaxial with the first winding;
   the second windings (43, 44) arranged between the first winding and the end coils, and
   circumscribed circles of the second windings (43, 44) being convex relative to the first winding; and both ends of the second windings (43, 44) respectively connected with the first winding and third windings (41, 42), which are adjacent the end coils.

2. The electrical linear actuator for the lock according to claim 1, wherein the third windings are (41, 42) coaxial with the first winding and are also arranged between the second windings (43, 44) and the end coils (45, 46); and both ends of the third windings (41, 42) are respectively connected with the end coils and the second windings, which are adjacent to the third windings.

3. The electrical linear actuator for the lock according to claim 2, wherein the diameter of the first winding is less than that of the end coils (45, 46); and corresponding end coils (45, 46) and third windings (41, 42) form conical springs.

4. The electrical linear actuator for the lock according to claim 1, wherein the second windings (43, 44) of the spring (4) take the shape of circular rings of which the diameter is less than that of the first winding; and the spiral direction thereof is opposite to that of the first winding (40).

5. The electrical linear actuator for the lock according to claim 4, wherein the difference of the angle θ between centerlines of the projecting second windings (43, 44) of the spring (4) is between 70 degrees and 90 degrees.

6. The electrical linear actuator for the lock according to claim 4, wherein the second windings (43, 44) of the spring (4) are arranged in the form of central symmetry; and the difference of the angle θ between the centerlines of the projecting second windings (43, 44) of the spring (4) is 180 degrees.

7. The electrical linear actuator for the lock according to claim 2, wherein the second windings (43, 44) of the spring (4) are V-shaped;

one side of each V-shaped second winding is tangential to the first winding (40) while the other side of the V-shaped second winding is tangential to one of the third windings (41, 42); and two sides tangential to the third windings are parallel to each other.

8. The electrical linear actuator for the lock according to claim 1, wherein the second windings (43, 44) of the spring (4) are V-shaped; and the diameter of circular arcs at the bottoms of the V-shaped second windings is less than that of the first winding (40).

9. The electrical linear actuator for the lock according to claim 8, wherein the difference of the angle θ between the centerline of the projecting second windings (43, 44) of the spring (4) is between 70 degrees and 90 degrees.

10. The electrical linear actuator for the lock according to claim 9, wherein notches (25, 26) are formed at corresponding positions of the frame (20) of the slider (2) and the second windings (43, 44);

portions of the tops of V-shaped portions of the second windings are extended into the notches.

11. The electrical linear actuator for the lock according to claim 1, wherein the vertical distance from convex vertexes of the second windings (43, 44) to an axial line of the first winding (40) is more than the vertical distance from inner walls (21, 22) of the slider to the axial line of the first winding after the spring (4) is assembled into the slider.

12. The electrical linear actuator for the lock according to claim 1, wherein transition portions (47, 48) are formed between the second windings (43, 44) and the first winding (40);

the helix angle of the transition portions is the sum of the helix angle α of the first winding (40) and an inclination angle β; and the inclination angle β is between 3 degree and 7 degree.

13. The electrical linear actuator for the lock according to claim 1, wherein the pin (5) is fixed in a hole (30) formed on the rotating shaft (3);

one portion of the pin extended out of the rotating shaft has a smooth outer surface; and the extended portion is arranged above the first winding (40).

14. The electrical linear actuator for the lock according to claim 13, wherein the pin (5) is formed by bending a steel wire;

bends (51) are formed at both ends of the pin; and both ends of the steel wire are disposed in the middle part of the pin.

15. The electrical linear actuator for the lock according to claim 14, wherein one steel wire end of the pin (5) is bent to form a gap (52) which forms an acute angle with a central axis of the pin.

16. The electrical linear actuator for the lock according to claim 13, wherein the pin (5) is formed by bending a steel wire;

one end of the pin is a double bend (50) and the other end of the pin is a single bend (51); and both ends of the steel wire are disposed in the middle part of the pin.

17. The electrical linear actuator for the lock according to claim 16, wherein one steel wire end of the pin (5) is bent to form a gap (52) which forms an acute angle with a central axis of the pin.

18. The electrical linear actuator for the lock according to claim 1, wherein the grooves (23, 24) formed on a wall of the slider (2) are U-shaped grooves.

19. The electrical linear actuator for the lock according to claim 1, wherein a convex wing (27) is formed on an outer surface of the slider (2) and used to detect the position of the slider.

* * * * *